(12) United States Patent
Fukuda et al.

(10) Patent No.: US 6,720,106 B2
(45) Date of Patent: Apr. 13, 2004

(54) MEMBRANE ELECTRODE ASSEMBLY FOR FUEL AND PROCESS FOR PRODUCING THE SAME

(75) Inventors: Kaoru Fukuda, Saitama (JP); Masaaki Nanaumi, Saitama (JP); Nobuhiro Saito, Saitama (JP); Yoichi Asano, Saitama (JP); Nagayuki Kanaoka, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 398 days.

(21) Appl. No.: 09/942,123

(22) Filed: Aug. 30, 2001

(65) Prior Publication Data

US 2002/0055034 A1 May 9, 2002

(30) Foreign Application Priority Data

Sep. 1, 2000 (JP) .................................... P2000-265407
Sep. 1, 2000 (JP) .................................... P2000-265408
Sep. 1, 2000 (JP) .................................... P2000-265409

(51) Int. Cl.$^7$ ................................................ H01M 4/86
(52) U.S. Cl. ............................ 429/42; 429/41; 429/40; 429/30; 429/33; 29/623.2; 29/623.5; 29/730; 29/746
(58) Field of Search ............................ 429/40, 41, 42, 429/30, 33; 29/623.2, 623.5, 730, 746

(56) References Cited

U.S. PATENT DOCUMENTS 6,391,487 B1 * 5/2002 Totsuka ...................... 429/41
6,485,855 B1 * 11/2002 Fukuda et al. ................ 429/30
6,610,432 B1 * 8/2003 Wilkinson et al. ............ 429/13

FOREIGN PATENT DOCUMENTS

JP          9-63622          7/1997

* cited by examiner

Primary Examiner—Bruce F. Bell
(74) Attorney, Agent, or Firm—Arent Fox Kintner Plotkin & Kahn, PLLC

(57) ABSTRACT

An membrane electrode assembly for a fuel cell composed of a pair of electrode catalyst layers and an electrolyte membrane sandwiched between the electrode catalyst layers is configured so that the catalyst of at least one surface of the electrode catalyst layers enters in the electrolyte membrane whereby the electrode catalyst layer and the electrolyte membrane are unified with each other. In this configuration, no exfoliation occurs at the interface between the electrode catalyst layer and the electrolyte membrane, and the durability of the membrane electrode assembly can be increased even during the course of heat cycles.

22 Claims, 11 Drawing Sheets

Power Generation Performance

MEMBRANE ELECTRODE ASSEMBLY FOR FUEL AND PROCESS FOR PRODUCING THE SAME

BACKGROUND OF THE INVENTION

1. Field of the Invention

The present invention relates to an membrane electrode assembly, which is used in a fuel cell and a process for producing the same. More Particularly, the invention relates to an membrane electrode assembly for a fuel cell having electrode catalyst layers and an electrolyte membrane unified with each other, and a process for producing the same.

2. Description of Related Arts

A fuel system is a system mainly composed of a fuel cell, which generates power by supplying hydrogen as fuel gas to a hydrogen pole side of the fuel cell and supplying oxidant gas containing oxygen to an oxygen pole side of the fuel cell. The fuel cell, which is the core part of the fuel cell system, directly converts chemical energy into electric energy, and has recently attracted considerable attention due to its high generation efficiency and little emission of harmful substances, etc.

First, a single cell, which makes up the fuel cell, will be described by referring to FIG. 1.

As shown in FIG. 1, the single cell CE is configured of a membrane membrane electrode assembly MEA composed of an electrolyte membrane M having electrode catalyst layers 1 ($1_H$ and $1_O$) provided on both surfaces (hydrogen pole and oxygen pole sides) thereof, and diffusion layers $2_H$ and $2_O$ and separators $3_H$ and $3_O$ laminated on both sides of the membrane membrane electrode assembly MEA, respectively. Parts residing at the oxygen pole side are expressed herein as numeral with subscript O and parts residing at the hydrogen pole side are expressed herein as numeral with subscript H. Also, if a part is not distinguished, no subscript is referred.

As the electrolyte membrane M, a polymer electrolyte membrane, such as perfluorocarbon sulfonic acid membrane, which is a proton (ion) exchange membrane, is generally used. The electrolyte membrane M has many proton exchange groups in the molecule thereof, exhibits low specific resistance not more than 20 Ω/cm at normal room temperature under the moisture saturation conditions, and serves as a proton conductive electrolyte membrane. By utilizing such a polymer electrolyte membrane in the single cell CE of the fuel cell, the fuel cell composed of the lamination of single cells CE is referred to as a polymer electrolyte membrane type fuel cell.

Each of the electrode catalyst layers 1 is composed of catalyst particles having catalytic metal such as platinum (which catalyzes oxidation or reduction) supported on a carrier such as carbon dispersed in an ion (proton) conductive resin.

Each of the diffusion layer 2 is provided in contact with a passage 4 on the surfaced of the separator 3, and has a function of transmitting the electrons between the electrode catalyst layer 1 and the separator 3, and the function of diffusing the fuel gas (hydrogen gas) or the oxidant gas (air) to be supplied into the electrode catalyst layer 1. The diffusion layer 2 is generally formed of a carbon material such as carbon paper, carbon cloth and carbon felt.

The separator 3 is composed of a material excelling in air tightness and excelling in thermal conductivity. The separator 3 separates the fuel gas, the oxidant gas, and the coolant from each other, has a passage 4, and serves as electron-transmitting function.

In the single cell CE of the fuel cell, when supply air is allowed to flow within the gas passage $4_O$ of the separator $3_O$ at the oxygen pole side and supply hydrogen is allowed to flow within the gas passage $4_H$ of the separator $3_H$ at the hydrogen pole side, the hydrogen at the hydrogen pole side is ionized by the canalization of the catalyst in the electrode catalyst layer $1_H$ to produce protons, which are migrated through the electrolyte membrane M and arrived at the oxygen pole side. The protons arrived at the oxygen pole side are readily reacted with the oxygen contained in the supply air in the presence of the catalyst of the electrode catalyst layer $1_O$ to produce water. The supply air containing the produced water and the oxygen remaining unused is discharged from an outlet of the fuel cell FC at the oxygen pole side as exhaust air (which contains a large amount of water). At the hydrogen pole side, electrons, $e^-$, are produced during the ionization of hydrogen. The produced electrons, $e^-$, are configured to be arrived at the oxygen pole side via an external load such as a motor (arrow in FIG. 1).

Several hundreds of such single cells are laminated to make up a fuel cell and are carried, for example, on a vehicle, etc. to be used.

Conventionally, in the single cell CE of the fuel cell having a configuration as described above, the electrode catalyst layers 1 have been constructed by adhering the electrode catalyst layers 1 onto the electrolyte membrane M, followed by thermally fusing them through a hot press or any other means. However, the electrode catalyst layer 1 has flat interfaces between the electrode catalyst layer 1 and the membrane electrode M, although it possesses several bite portions due the irregularity of the electrode catalyst layer 1.

In the case where the fuel cell is used, for example, in a vehicle, etc., the fuel cell has a hot cycle from the open air temperature (not more than freezing point at a winter season) up to a temperature exceeding approximately 85° C. during the course of running the vehicle. Consequently, adhering strength between the electrolyte membrane and the electrode catalyst layer enough for bearing the high temperature environment such as running the vehicle at a high temperature cannot be obtained, sometimes causing exfoliation between the electrolyte membrane and the electrode catalyst layer. In some cases, the interface between the electrolyte membrane and the electrode catalyst layer is aged during such a temperature cycle. Consequently, there leaves something to be improved.

SUMMARY OF THE INVENTION

An object of the present invention is, therefore, to provide an membrane electrode assembly for fuel cell, which can prevent from exfoliation of the interface between the electrolyte membrane M and the electrode catalyst layer 1, and which has high durability under temperature cycle from a temperature not more than freezing point up to a temperature not less than approximately 85° C.

Another object of the present invention is to provide a process for producing such a highly durable membrane electrode assembly for fuel cell with high efficiency.

We have made serious studies in light of the above situations. As a result, it has been found that these and other objects can be attained when an membrane electrode assembly for fuel cell composed of a pair of electrode catalyst layers and an electrolyte membrane sandwiched between the electrode catalyst layers is configured so that the catalysts of at least one surface of the electrode catalyst layers enter in the electrolyte membrane whereby the electrode catalyst layer and the electrolyte membrane are unified with each other. The present invention has been accomplished based on the discovery.

Specifically, the present invention relates to an membrane electrode assembly for a fuel cell composed of a pair of electrode catalyst layers and an electrolyte membrane sandwiched between the electrode catalyst layers configured so that the catalyst of at least one surface of the electrode catalyst layers enters in the electrolyte membrane whereby the electrode catalyst layer and the electrolyte membrane are unified with each other.

By such a configuration, the electrode catalyst layer or layers and the electrolyte membrane are formed into unification in such a manner that the compositions of the electrode catalyst layer and that of the electrolyte membrane are continuously changed around the interface between them. Consequently, no exfoliation occurs on the interface between the electrode catalyst layer and the electrolyte membrane, and the membrane electrode assembly having improved durability under a prescribed heat cycle can be provided.

In the membrane electrode assembly according to the present invention, it is preferable that an ion exchange density gradient coefficient calculated by the following equation (1):

$$\text{Coefficient}=(A-B)/(C-D) \qquad (1)$$

wherein A is an ion exchange capacity of the electrolyte membrane, B is an ion exchange capacity of the formed electrode catalyst layer, C is a thickness in $\mu$m of the electrolyte membrane before heating under a pressure, and D is a distance in $\mu$m of the catalyst particles entering into the electrolyte membrane in $\mu$m is not greater than $3.5 \times 10^3$ meq/g/cm.

By defining the portion where the electrode catalyst layer and the electrolyte membrane are unified with each other, the durability of the membrane electrode assembly becomes much more liable.

In the membrane electrode assembly according to the present invention, the depth of the catalyst entering in the electrolyte membrane is preferably in the range of from 5 $\mu$m to 20 $\mu$m.

Similarly, by defining the portion where the electrode catalyst layer and the electrolyte membrane are unified with each other, the durability of the membrane electrode assembly becomes much more liable.

According to one aspect of the present invention, the membrane electrode assembly for the fuel cell of the present invention is configured by dissolving the catalyst in a polar solvent and then dispersing the catalyst in an ion conductive polymer solution to prepare a slurry, directly applying the slurry onto at least one surface of the electrolyte membrane, followed by heating under a pressure to form the electrode catalyst layer or layers and to allow at least parts of the catalysts for entering in said electrolyte membrane during the heating under a pressure whereby said electrode catalyst layer and said electrolyte membrane are unified with each other.

Consequently, the present invention is directed to a process for an membrane electrode assembly for a fuel cell composed of a pair of electrode catalyst layers and an electrolyte membrane sandwiched between the electrode catalyst layers configured so that the catalyst of at least one surface of the electrode catalyst layers enters in the electrolyte membrane whereby the electrode catalyst layer and the electrolyte membrane are unified with each other, which comprises:

dissolving the catalyst making up the electrode catalyst layer in a polar solvent and then dispersing the catalyst in an ion conductive polymer solution to prepare a slurry having a viscosity of from 5,000 to 25,000 mPa.s, directly applying the resulting slurry onto at least one surface of the electrolyte membrane, followed by heating under a pressure to form the electrode catalyst layer or layers, and heating the slurry under a pressure to allow at least parts of the catalysts for entering in said electrolyte membrane during the heating under a pressure whereby said electrode catalyst layer and said electrolyte membrane are unified with each other.

By such a configuration, a durable membrane electrode assembly can be produced easily and securely. As used herein, the term "polar solvent" means any solvent which can exhibit a property of dissolving the electrolyte membrane.

In the process for an membrane electrode assembly for a fuel cell according to this embodiment, it is preferred that the heating under a pressure is carried out in a state where the polar solvent remaining in the slurry directly applied onto the electrolyte membrane is in amount of from 20 mg/cm$^2$ to 100 mg/cm$^2$ to allow the catalysts for entering in said electrolyte membrane.

By such a configuration, a much more durable membrane electrode assembly can be produced easily and securely.

According to another specific aspect of the present invention, the membrane electrode assembly for the fuel cell of the present invention is configured by dispersing the catalyst in a polar solvent soluble in the electrolyte membrane to prepare a slurry of the catalyst dispersed in the organic solvent, directly applying the slurry onto at least one surface of the electrolyte membrane, followed by heating under a pressure to allow at least parts of the catalysts for entering in said electrolyte membrane during the heating under a pressure whereby said electrode catalyst layer and said electrolyte membrane are unified with each other.

Consequently, the present invention is directed to a process for an membrane electrode assembly for a fuel cell composed of a pair of electrode catalyst layers and an electrolyte membrane sandwiched between the electrode catalyst layers configured so that the catalyst of at least one surface of the electrode catalyst layers enters in the electrolyte membrane whereby the electrode catalyst layer and the electrolyte membrane are unified with each other, which comprises:

dispersing the catalyst making up the electrode catalyst layer in an organic solvent soluble in the electrolyte membrane to prepare a slurry of the catalyst dispersed in the organic solvent having a viscosity of from 5,000 to 25,000 mPa.s, directly applying the resulting slurry onto at least one surface of the electrolyte membrane, followed by heating under a pressure to form the electrode catalyst layer or layers, and heating the slurry under a pressure to allow at least parts of the catalysts for entering in said electrolyte membrane during the heating under a pressure whereby said electrode catalyst layer and said electrolyte membrane are unified with each other.

By such a configuration, a durable membrane electrode assembly can be produced easily and securely.

In the process for an membrane electrode assembly for a fuel cell according to this embodiment, it is preferred that the heating under a pressure is carried out in a state where the polar solvent remaining in the slurry directly applied onto the electrolyte membrane is in amount of from 20 mg/cm$^2$ to 100 mg/cm$^2$ to allow the catalysts for entering in said electrolyte membrane.

By such a configuration, a much more durable membrane electrode assembly can be produced easily and securely.

According to still another specific aspect of the present invention, the membrane electrode assembly for the fuel cell of the present invention is configured by dissolving the catalyst making up the electrode catalyst layer in a polar solvent and then dispersing the catalyst in an ion conductive polymer solution to prepare a slurry, directly applying the slurry onto at least one surface the diffusion layer to be laminated on both sides of the membrane electrode assembly, applying the electrolyte membrane onto the applied surface of the slurry, followed by heating under a pressure to allow at least parts of the catalysts for entering in said electrolyte membrane during the heating under a pressure whereby said electrode catalyst layer and said electrolyte membrane are unified with each other.

Consequently, the present invention is directed to a process for an membrane electrode assembly for a fuel cell composed of a pair of electrode catalyst layers and an electrolyte membrane sandwiched between the electrode catalyst layers is configured so that the catalyst of at least one surface of the electrode catalyst layers enters in the electrolyte membrane whereby the electrode catalyst layer and the electrolyte membrane are unified with each other, which comprises:

dissolving the catalyst making up the electrode catalyst layer in a polar solvent and then dispersing the catalyst in an ion conductive polymer solution to prepare a slurry having a viscosity of from 5,000 to 25,000 mPa.s, directly applying the resulting slurry onto at least one surface the diffusion layer laminated on both sides of the membrane electrode assembly, applying the electrolyte membrane onto the applied surface of the slurry, followed by heating under a pressure to form the electrode catalyst layer or layers, and heating the slurry under a pressure to allow at least parts of the catalysts for entering in said electrolyte membrane during the heating under a pressure whereby said electrode catalyst layer and said electrolyte membrane are unified with each other.

By such a configuration, a durable membrane electrode assembly can be produced easily and securely.

In the process for an membrane electrode assembly for a fuel cell according to this embodiment, it is preferred that the heating under a pressure is carried out in a state where the polar solvent remaining in the slurry directly applied onto the electrolyte membrane is in amount of from 20 mg/cm$^2$ to 100 mg/cm$^2$ to allow the catalysts for entering in said electrolyte membrane.

By such a configuration, a much more durable membrane electrode assembly can be produced easily and securely.

DESCRIPTION OF THE PREFERRED EMBODIMENTS

The present invention will now be described by referring to the attached drawings, but it should be understood that the present invention is not restricted thereto.

Figure 1:
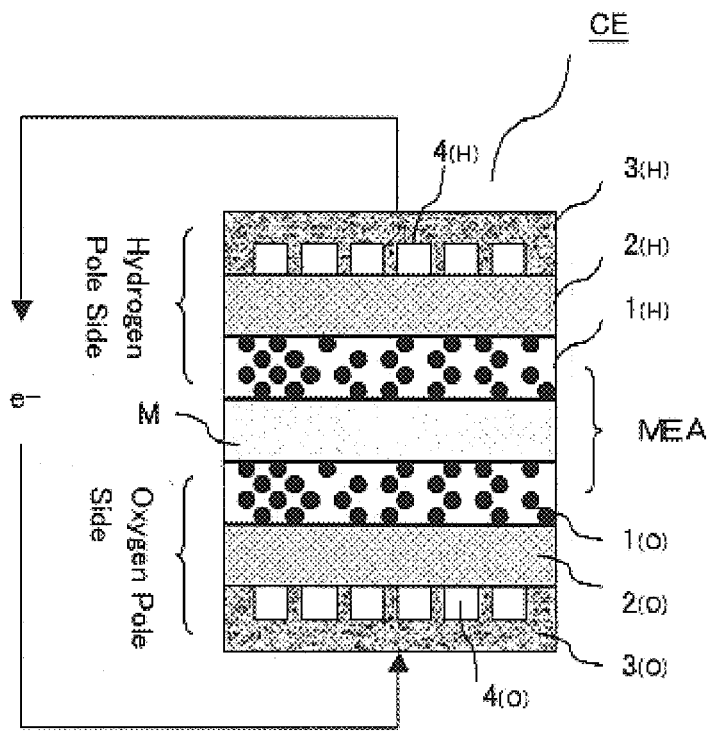
FIG. 1 is a schematic view showing an outline of a single cell of a fuel cell to which the present invention is applied.
Figure 2:
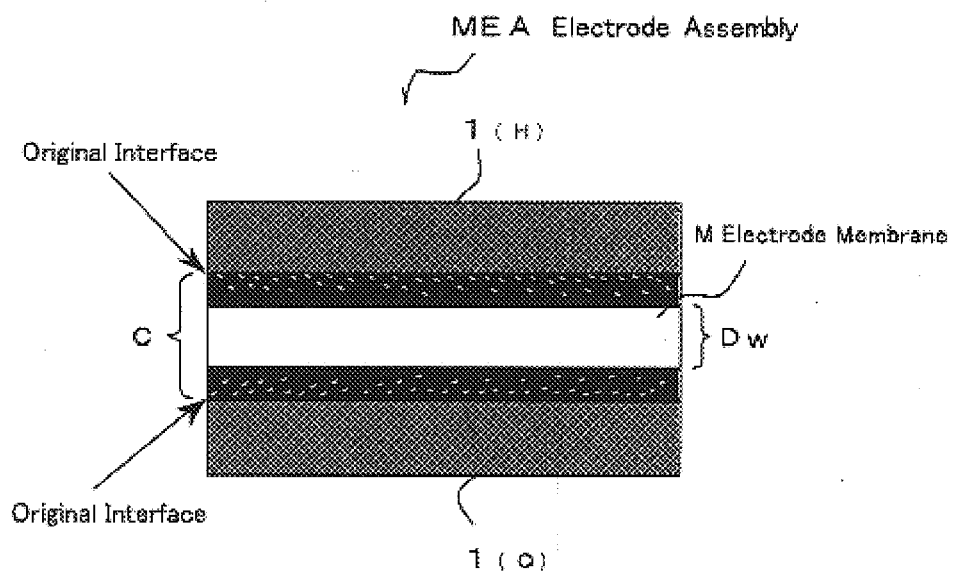
FIG. 2 is a sectional view of an membrane electrode assembly (for the fuel cell) according to the present invention.
Figure 3:
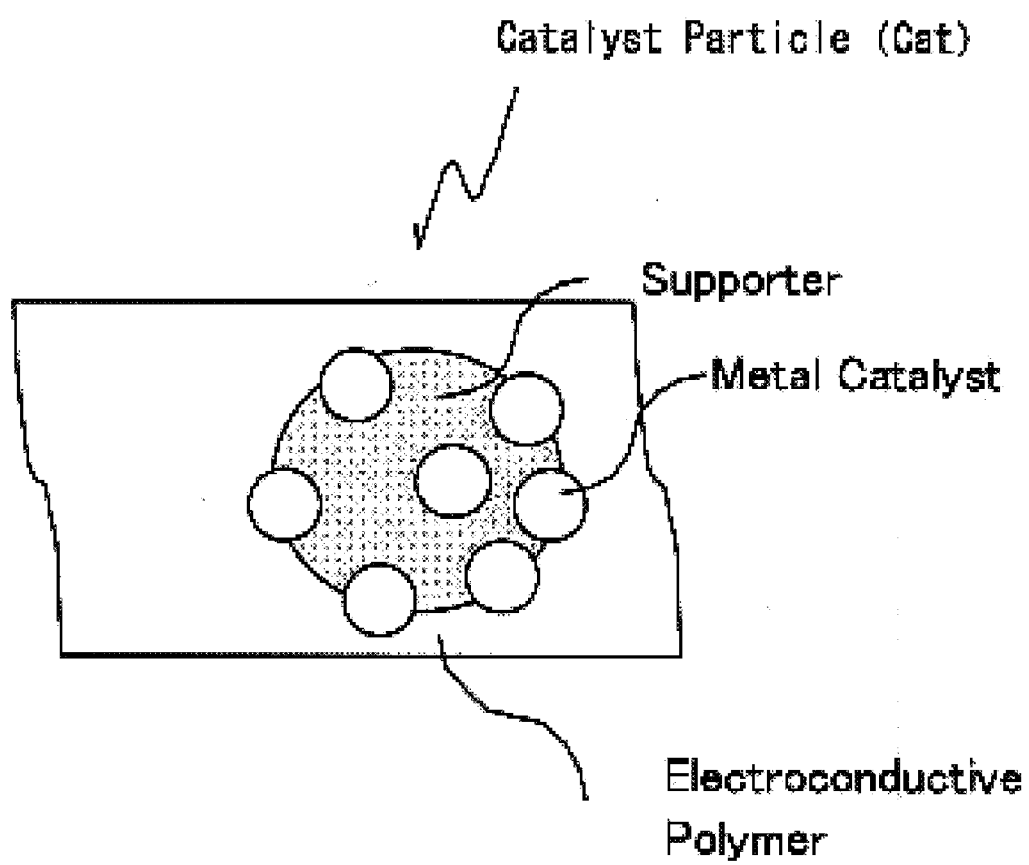
FIG. 3 is a schematic view showing a configuration of a catalyst particle.
Figure 4:
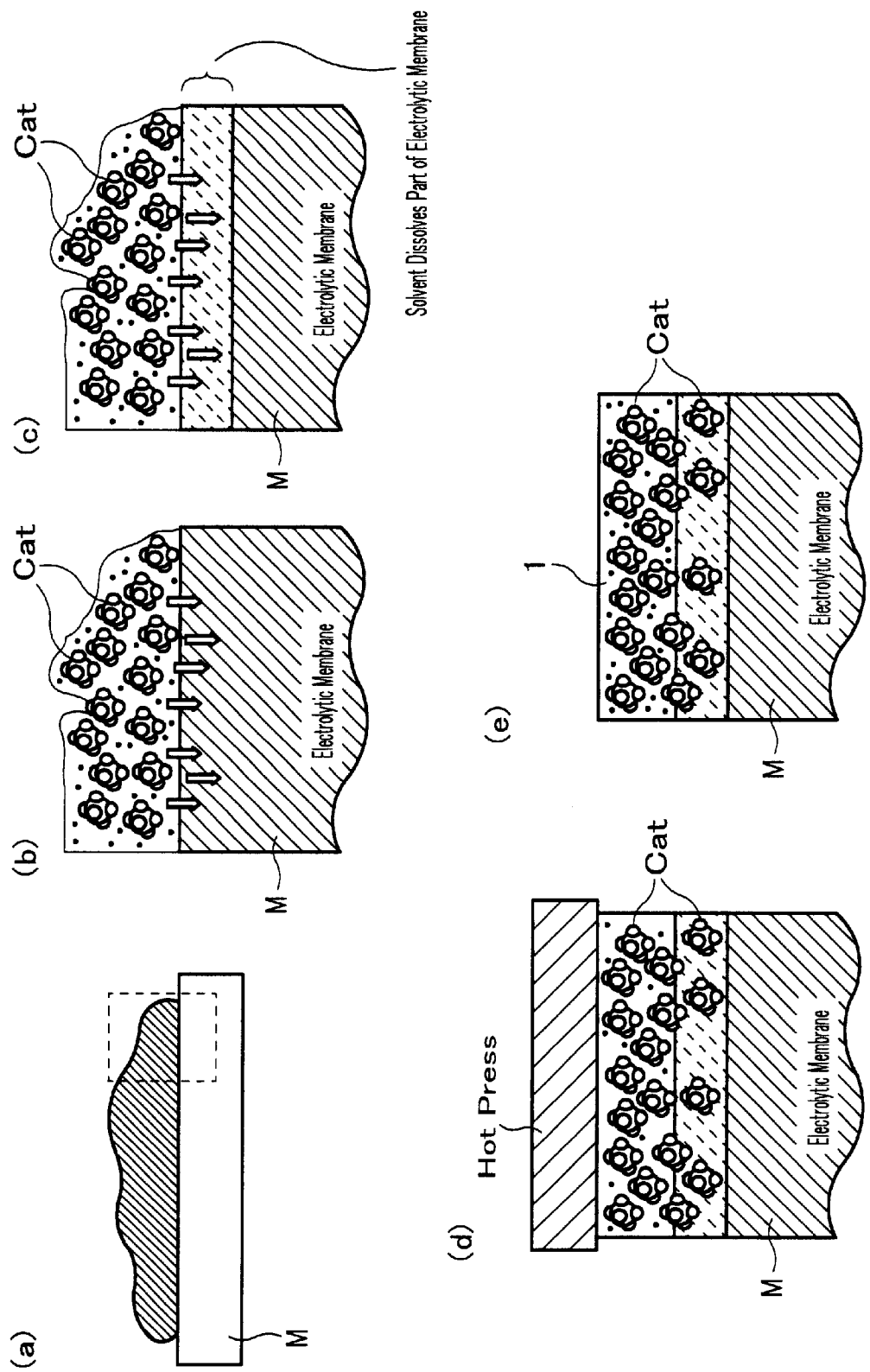
FIG. 4 is a schematic view schematically showing the process for producing an membrane electrode assembly according to the first embodiment of the present invention.
Figure 5:
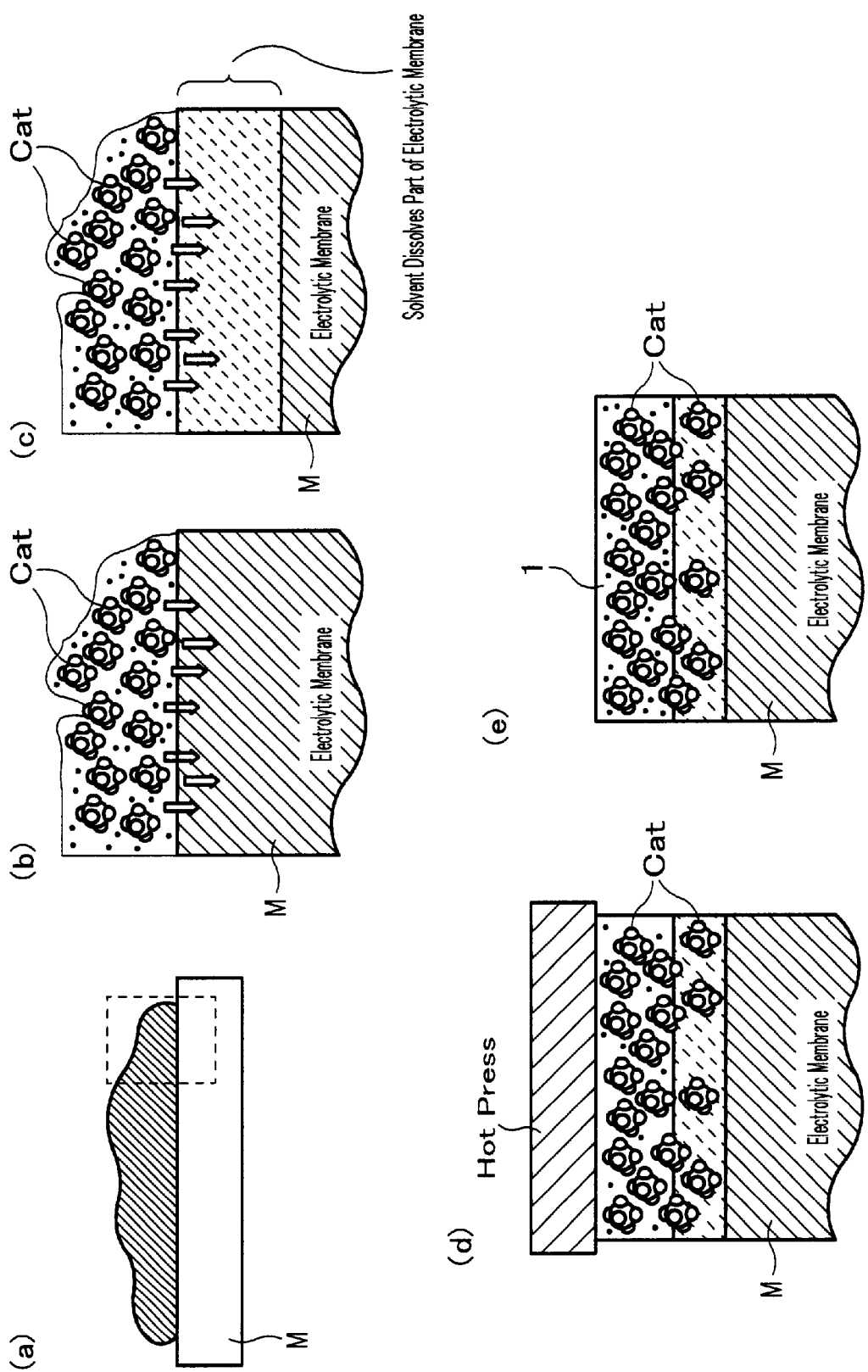
FIG. 5 is a schematic view schematically showing the process for producing an membrane electrode assembly according to the second embodiment of the present invention.
Figure 6:
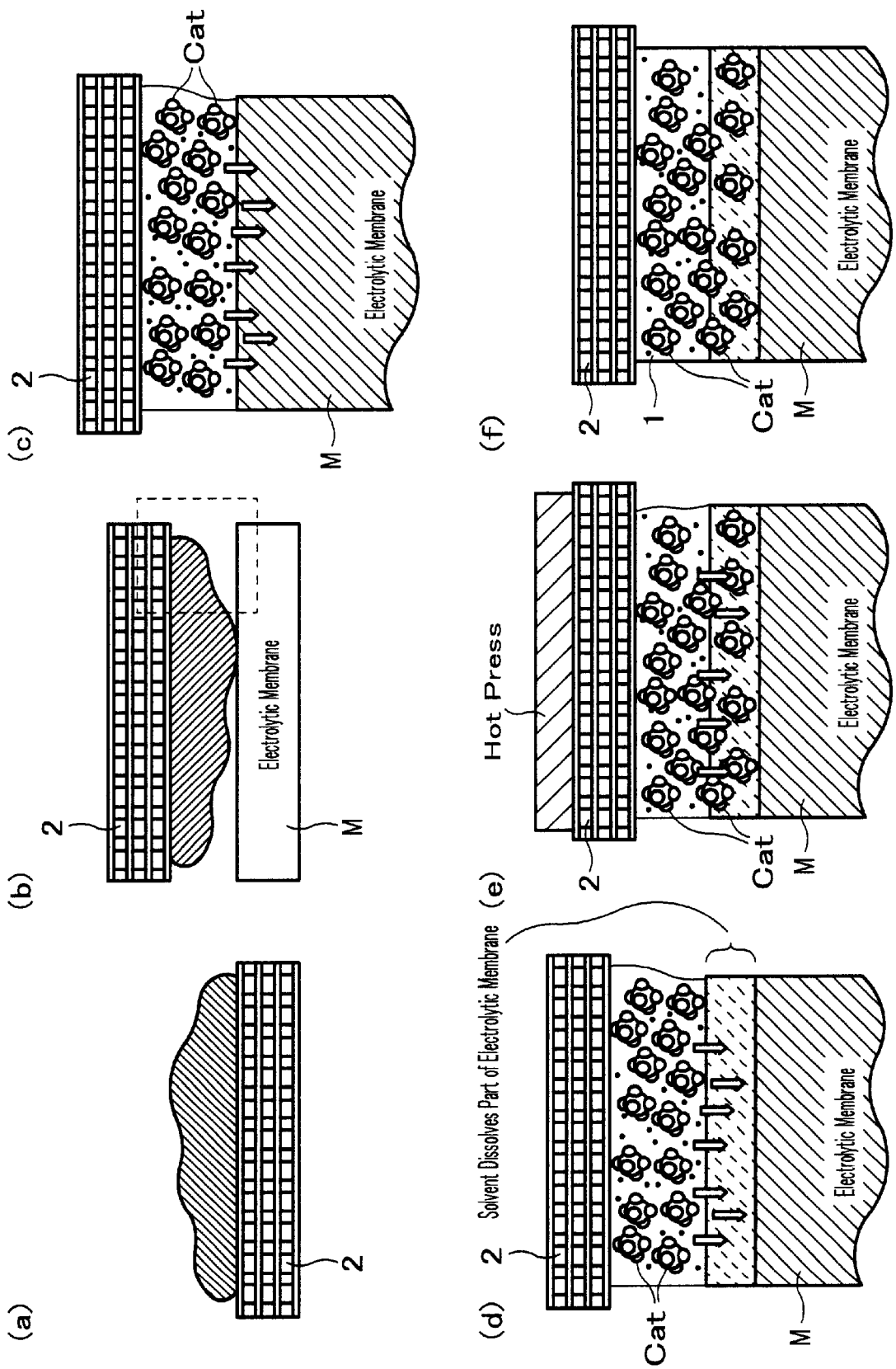
FIG. 6 is a schematic view schematically showing the process for producing an membrane electrode assembly according to the third embodiment of the present invention.

FIG. 1 is a schematic view showing an outline of a single cell of a fuel cell to which the present invention is applied, FIG. 2 is a sectional view of an membrane electrode assembly for the fuel cell (hereinafter referred to as "membrane electrode assembly" according to the present invention, FIG. 3 is a schematic view showing a configuration of a catalyst particle, and FIGS. 4 to 6 each shows a schematic view schematically showing the process for producing an membrane electrode assembly according to the present invention.

[Configuration of Membrane Electrode Assembly]

As shown in FIG. 1, an membrane electrode assembly MEA according to the present invention is mainly composed of an electrolyte membrane M and electrolyte membrane catalyst layers 1 laminated on the both surface of the electrolyte membrane M. Onto both surfaces of the membrane membrane electrode assembly configured as described above, diffusion layers 2 and separator 3 are laminated in this order to form a single cell CE. A lot of the single cells CE are laminated to form a fuel cell.

As the electrolyte membrane M of the membrane electrode assembly, for example, perfluorocarbon sulfonic acid which is a proton (ion) exchange membrane is generally used. This electrolyte membrane M has many proton-exchanging groups, and exhibits a low specific resistance of about 20 Ωcm proton at a normal room temperature when it is saturated with water, serving as a proton conductive electrolytic substance. It should be noted that the electrolyte membrane M, which can be used in the present invention, is not restricted thereto, and many other electrolyte membranes can be used, as long as they can be used in the single cell CE for a fuel cell.

The electrode catalyst layer 1 of the membrane electrode assembly MEA according to the present invention is composed of catalyst particles having metal catalysts supported on a proton conductive resin (see FIG. 3).

In general, a platinum group metal, typically platinum, as the metal catalyst is supported on carbon. However, it should be noted that the present invention is not restricted thereto, as long as it is applicable to the present invention.

A primer coat layer (not shown) may be provided between the electrode catalyst layer 2 and the diffusion layer 3 for the purpose of obtaining repellency or storage effect and/or preventing from the electrode catalyst layer encroaching on the diffusion layer 3. The primer coat layer is composed for example of a blend of carbon black power and Teflon powder or of carbon black power and an electrolyte solution.

In the membrane electrode assembly MEA according to the present invention, as shown in FIG. 2, parts of the catalyst particles in the electrode catalyst layer 1 enter into the electrolyte membrane M at a prescribed distance. Specifically, as different from the conventional membrane electrode assembly having a clear interface between the electrolyte membrane and the electrode catalyst layer, in the membrane electrode assembly of the present invention, the catalyst (the material constituting the electrode catalyst layer 1) enters in the electrolyte membrane in a prescribed degree to unify the electrolyte membrane M and the electrode catalyst layer 1.

In this case, the degree of the catalyst (catalyst particle) entering in the electrolyte membrane M can be expressed as an ion exchange density gradient coefficient calculated by the following equation (1):

$$\text{Coefficient} = (A-B)/(C-Dw)/2 \qquad (1)$$

wherein A is an ion exchange capacity of the electrolyte membrane, B is an ion exchange capacity of the electrode catalyst layer (the ion exchange capacity is that in the case where no catalyst particle enters in the electrolyte membrane M), C is a thickness in $\mu$m of the electrolyte membrane before heating under a pressure, and Dw is a distance in $\mu$m of the catalyst particles entering from both sides. The distance Dw is a thickness of the electrolyte membrane no catalyst particle entering therein.

Specifically, the ion exchange density gradient coefficient is indicated as an increase in the ion exchange capacity when the electrode catalyst layer 1 enters in the electrolyte membrane M in (C−Dw)/2.

It has been experimentally found in the present invention that the such an ion exchange density gradient coefficient is not greater than $3.5 \times 10^3$ meq/g/cm. Specifically, if it exceeds $3.5 \times 10^3$ meq/g/cm, the unification of the electrode catalyst layer 1 with the electrolyte membrane M is insufficient (i.e., the unified portion between them [the portion shown as gradation] is too small), and it is not preferable in terms of preventing the electrode catalyst layer 1 and the electrolyte membrane M from being separated (exfoliated) from each other.

Another measurement of the determination of the degree of the electrode catalyst layer 1 entering in the electrolyte membrane M is the depth of the catalyst entering in the electrode, i.e., (C−Dw/2) itself. The depth of the electrode catalyst layer 1 entering in the electrolyte membrane M is preferably in the range of from 5 $\mu$m to 20 $\mu$m. If the depth of the electrode catalyst layer 1 entering in the electrolyte membrane M is too shallow, it is not preferable in terms of preventing the electrode catalyst layer 1 and the electrolyte membrane M from being separated from each other. On the other hand, if it is too deep, the performance of the electrolyte membrane is decreased.

(First Embodiment)

In the first embodiment of the present invention, in order to attain such a configuration as shown in FIG. 2, the electrode catalyst layer 1 is unified with the electrolyte membrane M by directly applying a slurry comprising catalyst particles and an ion-conductive polymer membrane onto the electrolyte membrane M, and then heating the slurry under a pressure to allow parts of the catalyst particles for entering in the electrolyte membrane M.

Specifically, in the first embodiment of the present invention, with regard to the preparation of the electrode catalyst layer 1, the catalyst particles are dissolved in a polar solvent, and then dispersed in the ion conductive polymer solution to prepare the slurry, which is then directly applied onto the electrolyte membrane at a prescribed thickness. Subsequently, a heat treatment is carried out under a pressure to thereby allow the resulting electrode catalyst layer 1 for entering in the electrolyte membrane M. This forms the electrode catalyst layer 1 and the electrolyte membrane M unified with each other.

The solvent which is used herein is utilized for the purpose of allowing the catalyst particles for entering in the electrolyte membrane M. Examples of the solvent usable in the present invention include dimethyl acetamide, (boiling point: 166.5° C.), dimethyl formamide (boiling point: 153° C.), dimethyl sulfoxide (boiling point: 189° C.) triethyl phosphate (boiling point: 115° C.), N-methylpyrolidone (boiling point: 202° C.) and the like. They can be used singly or as a mixture of two or more thereof.

Although not being restricted as long as having been conventionally utilized, the ion exchange polymeric components usable in the present invention include polyether ether ketone, polyester sulphone, polyether imide, polyphenylene sulfide, polyphenylene oxides, and the like. They can be used singly or as a mixture of two or more thereof.

In the first embodiment of the present invention, when the supply is applied, the slurry may be applied on one surface of the electrolyte membrane and heated under a pressure (hot-pressed) to unify the electrode catalyst layer with the electrolyte membrane one surface by the other. However, since in this case there is a possibility to deform the membrane electrode assembly MEA due to thermal deformation etc., the slurry is preferably applied on both surfaces of the electrolyte membrane to unify the electrolyte membrane M with the electrode catalyst layers 1 all at once.

The pressure, the heating temperature, the period of hot press can be selected depending upon the solvent to be used, the viscosity of the slurry, and the like. Typically, the hot press is preferably carried out at a pressure of from 1.5 to 5 MPa (15–25 kgf/cm$^2$) and at a temperature of from 120 to 180° C. for a period of 30 to 60 seconds.

In this case, if the solvent remains in an amount of not less than 20 mg/cm$^2$, combined with the above conditions, the dissolving of the surface of the electrolyte membrane M takes place due to the residual solvent, which makes the catalyst easy to enter in the electrolyte membrane M whereby the catalysts can be pressed in at an appropriate depth.

The viscosity of the slurry in this case is not specifically restricted as long as the slurry can be directly applied to the electrolyte membrane M and the prescribed electrode catalyst layer 1 defined in the present invention can be formed, and is preferably in the range of from 5,000 to 25,000 mPa.s. Specifically, if the slurry viscosity is less than 5,000 mPa.s, there is a possibility to leak the slurry during the course of the hot-pressing. Conversely, if the slurry viscosity exceeds 25,0000 mPa.s, there is a possibility that the slurry can be handled only with difficulty.

As described above, when the electrolyte membrane M and the electrode catalyst layer in the membrane electrode assembly are unified according to the first embodiment of the preset invention, the bonding strength at the interface between the electrolyte membrane M and electrode catalyst layer 1 is enhanced, and the exfoliation between them which would occur due to the heat stress at a high temperature and the exfoliation due to a temperature cycle can be prevented.

(Production of Membrane Electrode Assembly)

Now, referring to FIG. 4, the process for producing the membrane electrode assembly in which the electrolyte membrane M and the electrode catalyst layer 1 are unified according to the first embodiment of the present invention will be described.

In the preparation of the membrane electrode assembly MEA, first, the catalyst particles are dissolved in the polar solvent which can dissolve the electrolyte membrane M, and dispersed in the ion conductive polymer solution to form a slurry in such a manner that the viscosity thereof becomes 5,000 to 25,000 mPa.s.

Subsequently, as shown in FIG. 4A, the slurry thus prepared is then directly applied onto the electrolyte membrane M in an appropriate amount.

If desired, a primer coat layer may be formed by placing a slurry for formation of the primer coat layer comprising carbon black powers and Teflon powders, or comprising carbon black powders and an electrolytic solution (ion conductive polymer solution) on the slurry for formation of the electrode catalyst layer.

FIGS. 4B to 4E are cross-sectional views which enlarge a part of FIG. 4A, and they illustrate the state where the catalyst layer 1 is unified with the electrolyte membrane M according to the present invention.

As shown in FIG. 4B, first, the polar solvent contained in the slurry for formation of the electrode catalyst layer, which has been applied, is started to dissolve the electrolyte membrane M.

Then, as shown in FIG. 4C, the polar solvent dissolves a part of the electrolyte membrane M.

Subsequently, as shown in FIG. 4D, when the hot-press is carried out from the slurry for formation of the electrode catalyst layer, the catalyst particles Cat enter in the portions where the polar solvent dissolves the electrolyte membrane M. In this case, it is preferable that the hot-pressing is carried out under the situation where the polar solvent (organic solvent) remains in an amount of not less than 20 mg/cm$^2$.

After the hot-pressing has been completed, the temperature and pressure are released to form an membrane electrode assembly MEA in which the electrolyte membrane M and the electrode catalyst layer 1 are unified, as illustrated in FIG. 4E.

As described above, a highly durable membrane electrode assembly MEA can be produced in simplified processes. It is noted that the electrode catalyst layer 1 is formed in the state where it is a heaped-up onto the electrolyte membrane M, the interface between them (the electrolyte membrane M and the electrode catalyst layer 1) is in completely harmony.

(Second Embodiment)

According to the second embodiment of the present invention, in order to attain such a configuration as shown in FIG. 2, a slurry of the catalyst dispersed in the organic solvent having catalyst particles dispersed in an organic solvent soluble in the electrolyte membrane M is directly applied onto the electrolyte membrane M, followed by heating under a pressure to allow the catalyst particles for entering in the electrolyte membrane M whereby the electrode catalyst layer 1 and the electrolyte membrane M are unified with each other.

Specifically, according to the second embodiment of the present invention, the organic solvent dissolves the electrolyte membrane M whereby the catalyst particles enter from the surface of the electrolyte membrane M into the interior thereof. This forms the electrode catalyst layer 1 within a part of the electrolyte membrane M to construct the membrane electrode assembly MEA. It is noted that the thickness of the electrolyte membrane M before the formation of the electrode catalyst layer 1 is substantially the same as that after the formation of the electrode catalyst layer 1, or the thickness after the formation of the electrode catalyst layer 1 is somewhat larger than that before the formation.

The distribution of the concentration of the catalyst in the membrane electrode assembly MEA will now be supplementary described by referring to FIG. 2.

As shown in FIG. 2., a portion in which the catalyst particles are concentrated is formed from the surface of the membrane electrode assembly MEA to a prescribed depth. This is the portion where the electrode catalyst layer 1 is formed. As the depth is increased, the concentration of the catalyst particles are gradually decreased, and then no catalyst particle enters in the electrolyte membrane. By carrying out the process which will be described later on, the membrane electrode assembly MEA as shown in FIG. 2 can be obtained.

The solvent used herein is an organic solvent which allows the catalyst particles in the slurry for entering in the electrolyte membrane M, and a polar solvent which can be dissolved in the electrolyte membrane M can be used. Examples of the organic solvent usable in the present invention include dimethyl acetamide, (boiling point: 166.5° C.), dimethyl formamide (boiling point: 153° C.), dimethyl sulfoxide (boiling point: 189° C.), triethyl phosphate (boiling point: 115° C.), N-methylpyrolidone (boiling point: 202° C.), and the like. They can be used singly or as a mixture of two or more thereof.

In the second embodiment of the present invention, when the supply is applied, the slurry may be applied on one surface of the electrolyte membrane and heated under a pressure (hot-pressed) to unify the electrode catalyst layer with the electrolyte membrane one surface by the other. However, since in this case there is a possibility to deform the membrane electrode assembly MEA due to thermal deformation etc., the slurry is preferably applied on both surfaces of the electrolyte membrane to unify the electrolyte membrane M with the electrode catalyst layers 1 all at once.

The pressure, the heating temperature, the period of hot press can be selected depending upon the solvent to be used, the viscosity of the slurry, and the like. Typically, the hot press is preferably carried out at a pressure of from 1.5 to 5 MPa (15–25 kgf/cm$^2$) and at a temperature of from 120 to 180° C. for a period of 30 to 60 seconds.

In this case, if the solvent remains in an amount of not less than 20 mg/cm$^2$, combined with the above conditions, the dissolving of the surface of the electrolyte membrane M takes place due to the residual solvent, which makes the catalyst easy to enter in the electrolyte membrane M whereby the catalysts can be pressed in at an appropriate depth.

The viscosity of the slurry in this case is not specifically restricted as long as the slurry can be directly applied to the electrolyte membrane M and the prescribed electrode catalyst layer 1 defined in the present invention can be formed, and is preferably in the range of from 5,000 to 25,000 mPa.s. Specifically, if the slurry viscosity is less than 5,000 mPa.s, there is a possibility to leak the slurry during the course of the hot-pressing. Conversely, if the slurry viscosity exceeds 25,0000 mPa.s, there is a possibility that the slurry can be handled only with difficulty.

As described above, when the electrolyte membrane M and the electrode catalyst layer in the membrane electrode assembly are unified according to the first embodiment of the preset invention, the bonding strength at the interface between the electrolyte membrane M and electrode catalyst layer 1 is enhanced, and the exfoliation between them which would occur due to the heat stress at a high temperature and the exfoliation due to a temperature cycle can be prevented.

(Production of Membrane Electrode Assembly)

Now, referring to FIG. 5, the process for producing the membrane electrode assembly in which the electrolyte membrane M and the electrode catalyst layer 1 are unified according to the first embodiment of the present invention will be described.

In the preparation of the membrane electrode assembly MEA, first, the catalyst particles are dissolved in the polar solvent which can dissolve the electrolyte membrane M to form a slurry of the catalyst dispersed in the organic solvent in such a manner that the viscosity thereof becomes 5,000 to 25,000 mPa.s.

Subsequently, as shown in FIG. 5A, the slurry thus prepared is then directly applied onto the electrolyte membrane M in an appropriate amount.

If desired, a primer coat layer may be formed by placing a slurry for formation of the primer coat layer comprising carbon black powers and Teflon powders, or comprising carbon black powders and an electrolytic solution (ion conductive polymer solution) on the slurry for formation of the electrode catalyst layer.

FIGS. 5B to 5E are cross-sectional views which enlarge a part of FIG. 5A, and they illustrate the state where the catalyst layer 1 is unified with the electrolyte membrane M according to the present invention.

As shown in FIG. 5B, first, the polar solvent, which can dissolve the electrolyte membrane M, contained in the slurry for formation of the electrode catalyst layer, which has been applied, is started to dissolve the electrolyte membrane M.

Then, as shown in FIG. 5C, the polar solvent dissolves a part of the electrolyte membrane M.

Subsequently, as shown in FIG. 5D, when the hot-press is carried out from the slurry for formation of the electrode catalyst layer, the catalyst particles Cat enter in the portions where the polar solvent dissolves the electrolyte membrane M. In this case, it is preferable that the hot-pressing is carried out under the situation where the polar solvent (organic solvent) remains in an amount of not less than 20 mg/cm$^2$.

After the hot-pressing has been completed, the temperature and pressure are released to form an membrane electrode assembly MEA in which the electrolyte membrane M and the electrode catalyst layer 1 are unified.

As described above, a highly durable membrane electrode assembly MEA can be produced in simplified processes. It is noted that the electrode catalyst layer 1 is formed in the state where it is a heaped-up onto the electrolyte membrane M, the interface between them (the electrolyte membrane M and the electrode catalyst layer 1) is in completely harmony.

(Third Embodiment)

According to the second embodiment of the present invention, in order to attain such a configuration as shown in FIG. 2, the catalyst particles is dispersed in a polar solvent and dispersed in an ion-conductive polymer solution to prepare slurry. The slurry is directly applied onto the diffusion layer, and the applied surface of the slurry is applied to the electrolyte membrane M, followed by heating under a pressure to allow parts of the catalyst particles for entering in the electrolyte membrane M whereby the electrode catalyst layer 1 and the electrolyte membrane M are unified with each other.

Specifically, the catalyst particles are dissolved in a polar solvent, and the mixture is dispersed in the ion conductive macro molecule solution to prepare the slurry, which is then directly applied onto the diffusion layer at a prescribed thickness. Subsequently, the slurry thus applied is laminated on the surface of the electrolyte membrane M, and hot-pressing is carried out to allow a part of the catalyst particles for entering in the electrolyte membrane M, whereby the electrode catalyst layer 1 is unified with the electrolyte membrane M.

The solvent which is used herein is utilized for the purpose of allowing the catalyst particles for entering in the electrolyte membrane M. Examples of the solvent usable in the present invention include dimethyl acetamide, (boiling point: 166.5° C.), dimethyl formamide (boiling point: 153° C.), dimethyl sulfoxide (boiling point: 189° C.), triethyl phosphate (boiling point: 115° C.), N-methylpyrrolidone (boiling point: 202° C.), and the like. They can be used singly or as a mixture of two or more thereof.

Although not being restricted as long as having been conventionally utilized, the ion exchange polymeric components usable in the present invention include polyether ether keton, polyester sulphone, polyether imide, polyphenylene sulfide, polyphenylene oxides, and the like. They can be used singly or as a mixture of two or more thereof.

In the third embodiment of the present invention, when the supply is applied, the slurry may be applied on one surface of diffusion layer 3 and then laminated on the electrolyte membrane 1 and heated under a pressure (hot-pressed) to unify the electrode catalyst layer with the electrolyte membrane one surface by the other. However, since in this case there is a possibility to deform the membrane electrode assembly MEA due to thermal deformation etc., the slurry is preferably applied on both surfaces of the diffusion layers 3 to unify the electrolyte membrane M with the electrode catalyst layers 1 all at once.

The pressure, the heating temperature, the period of hot press can be selected depending upon the solvent to be used, the viscosity of the slurry, and the like. Typically, the hot press is preferably carried out at a pressure of from 1.5 to 5 MPa (15–25 kgf/cm$^2$) and at a temperature of from 120 to 180° C. for a period of 30 to 60 seconds.

In this case, if the solvent remains in an amount of not less than 20 mg/cm$^2$, combined with the above conditions, the dissolving of the surface of the electrolyte membrane M takes place due to the residual solvent, which makes the catalyst easy to enter in the electrolyte membrane M whereby the catalysts can be pressed in at an appropriate depth.

The viscosity of the slurry in this case is not specifically restricted as long as the slurry can be directly applied to the diffusion layer 3 and the prescribed electrode catalyst layer 1 defined in the present invention can be formed, and is preferably in the range of from 5,000 to 25,000 mPa.s. Specifically, if the slurry viscosity is less than 5,000 mPa.s, there is a possibility to leak the slurry during the course of the hot-pressing. Conversely, if the slurry viscosity exceeds 25,0000 mPa.s, there is a possibility that the slurry can be handled only with difficulty.

As described above, when the electrolyte membrane M and the electrode catalyst layer in the membrane electrode assembly are unified according to the first embodiment of the preset invention, the bonding strength at the interface between the electrolyte membrane M and electrode catalyst layer 1 is enhanced, and the exfoliation between them which would occur due to the heat stress at a high temperature and the exfoliation due to a temperature cycle can be prevented.
(Production of Membrane Electrode Assembly)

Now, referring to FIG. 6, the process for producing the membrane electrode assembly in which the electrolyte membrane M and the electrode catalyst layer 1 are unified according to the first embodiment of the present invention will be described.

In the preparation of the membrane electrode assembly MEA, first, the catalyst particles are dissolved in the polar solvent which can dissolve the electrolyte membrane M, and dispersed in the ion conductive polymer solution to form a slurry in such a manner that the viscosity thereof becomes 5,000 to 25,000 mPa.s.

Subsequently, as shown in FIG. 6A, the slurry thus prepared is then directly applied onto the diffusion layer 3 in an appropriate amount.

If desired, a primer coat layer may be formed at the same time with the formation of the electrode catalyst layer by placing a slurry for formation of the primer coat layer comprising carbon black powers and Teflon powders, or comprising carbon black powers and an electrolytic solution (ion conductive polymer solution) on the diffusion layer 3, and then applying the slurry for formation of the electrode catalyst layer on this slurry.

Subsequently, as shown in FIG. 6B, the slurry-applied surface of the diffusion layer 3 onto which the slurry has been thus applied is applied on the top surface of the electrolyte membrane M.

FIGS. 6C to 6F are cross-sectional views which enlarge a part of FIG. 6A, and they illustrate the state where the catalyst layer 1 is unified with the electrolyte membrane M according to the present invention.

As shown in FIG. 6C, first, the polar solvent contained in the slurry for formation of the electrode catalyst layer, which has been applied, is started to dissolve the electrolyte membrane M.

Then, as shown in FIG. 6D, the polar solvent dissolves a part of the electrolyte membrane M.

Subsequently, as shown in FIG. 6E, when the hot-press is carried out from the slurry for formation of the electrode catalyst layer, the catalyst particles Cat enter in the portions where the polar solvent dissolves the electrolyte membrane M. In this case, it is preferable that the hot-pressing is carried out under the situation where the polar solvent (organic solvent) remains in an amount of not less than 20 mg/cm$^2$.

After the hot-pressing has been completed, the temperature and pressure are released to form an membrane electrode assembly MEA in which the electrolyte membrane M and the electrode catalyst layer 1 are unified as shown in FIG. 6F.

As described above, a highly durable membrane electrode assembly MEA can be produced in simplified processes. It is noted that the electrode catalyst layer 1 is formed in the state where it is a heaped-up onto the electrolyte membrane M, the interface between them (the electrolyte membrane M and the electrode catalyst layer 1) is in completely harmony.

EXAMPLES

The present invention will now be described by referring to Examples. However, it should be noted that the present invention is not restricted thereto.

Example 1

An electrolytic component (PE: ion conductive polymeric substance) soluble in a polar solvent was mixed with catalyst particles (Cat) in a proportion so as to be a PE/Cat in weight ratio equal to 0.4, and then a solvent (N-methylpyrolidone) was added thereto so as to be a viscosity of 5,000 mPa.s, to thereby prepare slurry. The resulting slurry was dried until the residual amount of the polar solvent was 100 mg/cm$^2$, and then hot-press was carried out to unify the electrode catalyst layer 1 with the electrolyte membrane M, giving an membrane electrode assembly MEA according to the present invention. The physical properties of the resulting membrane electrode assembly MEA are shown in Table 1 and FIGS. 7 and 8.

In Table 1, the depth of the catalyst entering in the electrolyte membrane ($\mu$m) was actually determined by a scanning electro microscope (SEM), the gradient density was obtained by measuring the average distance between the catalyst particles entering from both sides, and calculated from the equation (1) described above.

The exfoliation ratio during the heat cycle was obtained by repeating 100 cycles of the heat environment where the membrane electrode assembly was kept at $-40°$ C. for 30 minutes and at $90°$ C. for 30 minutes, and the situation of the exfoliation at the surface was image-processed. The value of the exfoliation ratio was obtained as an exfoliated area in a unit observation area. The cross leakage amount (gas permeability: cc/cm$^2$) was obtained by fitting the membrane electrode assembly to a single cell for a fuel cell, immersing the single cell in water, supplying test gas from a gas inlet, and measuring the amount of the gas exhaust from the gas outlet via the membrane material.

Examples 2 to 9 and Comparative Example 1

Example 1 was repeated, except for varying the viscosities of the slurry and the residual amounts of the solvent shown in Table 1. The results are shown in Table 1 and FIGS. 7 and 8.

TABLE 1

| | Production Conditions | | | Physical Properties of Membrane electrode assembly | | |
|---|---|---|---|---|---|---|
| | Residual Solvent | Viscosity | Depth ($\mu$m) | Density Gradient Coefficient | Exfoliation Ratio During Heat Cycles | Cross Leakage Amount |
| Ex. 1 | 100 | 1500 | 20 | 859.00 | 7.7 | 6.12 |
| Ex. 2 | 50 | 1500 | 12 | 1431.67 | 7.8 | 5.36 |
| Ex. 3 | 20 | 1500 | 6 | 2863.33 | 8.2 | 5.13 |
| Ex. 4 | 20 | 5000 | 5 | 3436.00 | 8.5 | 5.08 |
| Ex. 5 | 20 | 25000 | 6 | 2863.33 | 8.2 | 5.13 |
| Ex. 6 | 20 | 3000 | 3 | 5726.67 | 12.5 | 5.00 |
| Ex. 7 | 20 | 35000 | 4 | 4295.00 | 10.9 | 5.05 |
| Ex. 8 | 10 | 15000 | 3 | 5726.67 | 12.5 | 5.00 |
| Ex. 9 | 150 | 15000 | 24 | 715.83 | 7.6 | 12.00 |
| Comp. Ex. 1 | <0.5 | 15000 | 0 | — | 22 | 4.80 |

Figure 7:
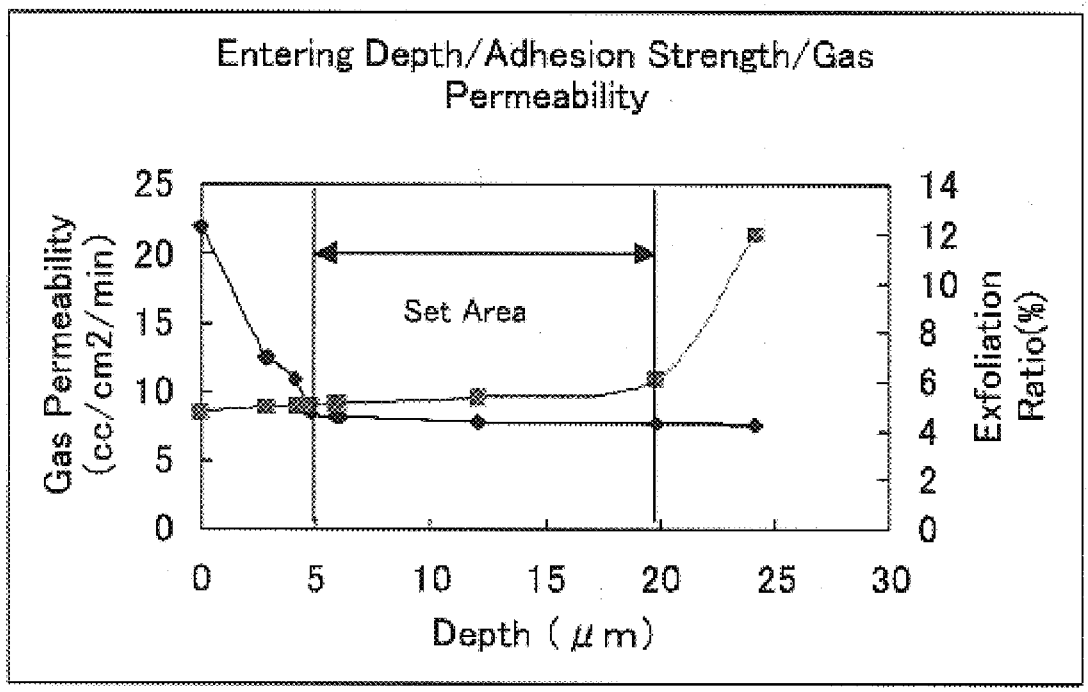
FIG. 7 is a graph showing the relation between the depth of the electrode catalyst layer entering in the electrolyte membrane and gas-permeability, and the exfoliation rate during a given heat cycle according to one embodiment of the present invention and Comparative Example.

As shown in Table 1 and FIG. 7, it has proven that the membrane electrode assembly according to the present invention in which the electrode catalyst layer 1 and the electrolyte membrane are unified with each other excels in exfoliation ratio during the heat cycles and the cross leakage amount (gas permeability: cc/cm$^2$) and, especially it has been proven that those whose depth of the catalyst particles entering in the electrolyte membrane ranging from 5 to 20 $\mu$m is preferred. In contrast, it has also been proven that the membrane electrode assembly of Comparative Example 1 in which the electrode catalyst layer 1 and the electrolyte membrane are not unified with each other has remarkable poor exfoliation ratio.

Also, it has been understood that when the depth of the catalyst entering in the electrolyte membrane is shallow, it has a tendency that the density gradient coefficient becomes large and a tendency that the exfoliation ratio during the heat cycles becomes small. In order to make the depth of the catalyst entering in the electrolyte membrane deep, the viscosity of the slurry is proven to be small. Also, in order to make the depth of the catalyst entering in the electrolyte membrane deep, the amount of the redial solvent has been proven to be large.

Figure 8:
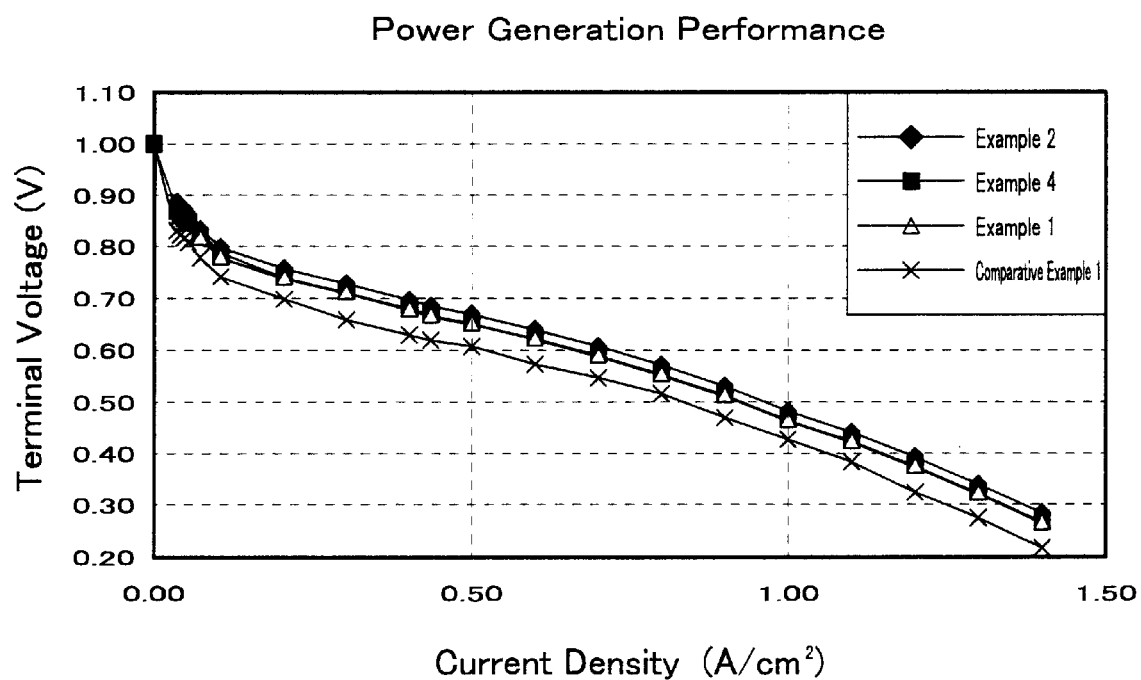
FIG. 8 is a graph showing the relation between the current density and terminal voltage according to one embodiment of the present invention and Comparative Example.

As shown in FIG. 8, over the entire region of the current density measured, the membrane electrode assembly MEA of the present invention has a terminal voltage higher than that of Comparative Example 1. Consequently, the membrane electrode assembly according to the present invention not only excels in durability but also has a capability of supplying much higher power.

Example 10

Catalyst (cat) was added to a polar solvent (N-methylpyrolidone) so as to be a viscosity of 5,000 mPa.s, to thereby prepare a slurry of the catalyst dispersed in the organic solvent. The resulting slurry of the catalyst dispersed in the organic solvent was dried until the residual amount of the polar solvent was 100 mg/cm$^2$, and then hot-press was carried out to unify the electrode catalyst layer 1 with the electrolyte membrane M, giving an membrane electrode assembly MEA according to the present invention. The physical properties of the resulting membrane electrode assembly MEA are shown in Table 2 and FIGS. 9 and 10.

In Table 2, the depth of the catalyst entering in the electrolyte membrane ($\mu$m) was actually determined by a scanning electro microscope (SEM), the gradient density was obtained by measuring the average distance between the catalyst particles entering from both sides, and calculated from the equation (1) described above.

The exfoliation ratio during the heat cycle was obtained by repeating 100 cycles of the heat environment where the membrane electrode assembly was kept at −40° C. for 30 minutes and at 90° C. for 30 minutes, and the situation of the exfoliation at the surface was image-processed. The value of the exfoliation ratio was obtained as an exfoliated area in a unit observation area.

Examples 11 to 18 and Comparative Example 2

Example 10 was repeated, except for varying the viscosities of the slurry and the residual amounts of the solvent shown in Table 2. The results are shown in Table 2 and FIGS. 9 and 10.

TABLE 2

| | Production Conditions | | Physical Properties of Membrane electrode assembly | | |
|---|---|---|---|---|---|
| | Residual Solvent | Viscosity | Depth ($\mu$m) | Exfoliation Ratio During Heat Cycles | Cross Leakage Amount |
| Ex. 10 | 100 | 1500 | 19.9 | 7.7 | 6.12 |
| Ex. 11 | 50 | 1500 | 11.9 | 7.8 | 5.36 |
| Ex. 12 | 20 | 1500 | 6.1 | 8.2 | 5.13 |
| Ex. 13 | 20 | 5000 | 4.9 | 8.5 | 5.08 |
| Ex. 14 | 20 | 25000 | 6.0 | 8.2 | 5.13 |
| Ex. 15 | 20 | 3000 | 2.9 | 12.5 | 5.00 |
| Ex. 16 | 20 | 35000 | 4.0 | 10.9 | 5.05 |
| Ex. 17 | 10 | 15000 | 2.8 | 12.5 | 5.00 |
| Ex. 18 | 150 | 15000 | 24.3 | 7.6 | 12.00 |
| Comp. Ex. 2 | <0.5 | 15000 | 0.0 | 22 | 4.80 |

Figure 9:
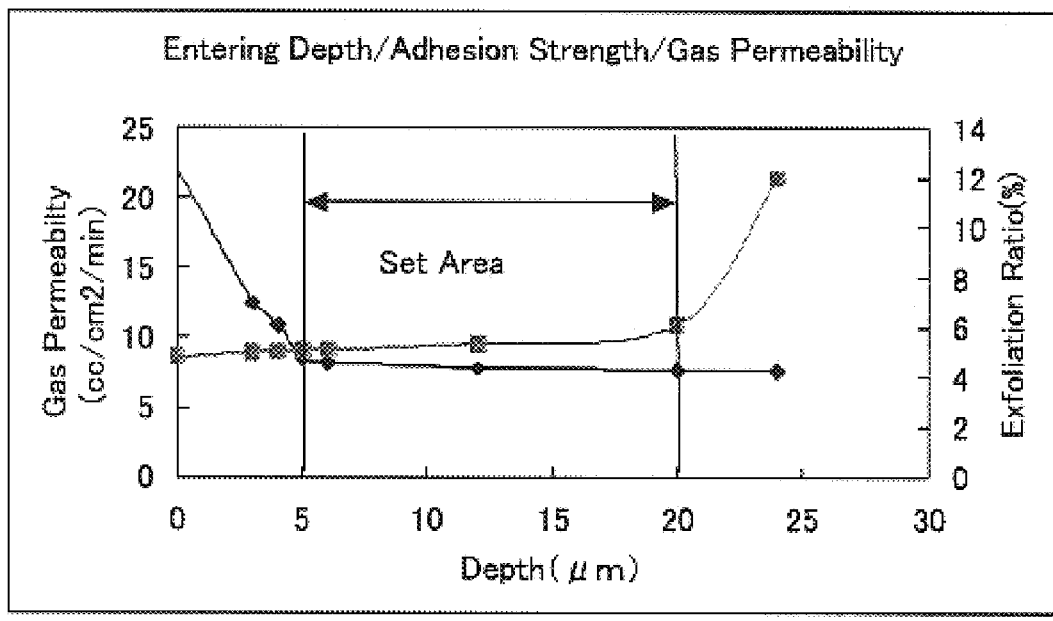
FIG. 9 is a graph showing the relation between the depth of the electrode catalyst layer entering in the electrolyte membrane and gas-permeability, and the exfoliation rate during a given heat cycle according to another embodiment of the present invention and Comparative Example.

As shown in Table 2 and FIG. 9, it has proven that the membrane electrode assembly of the present invention in which the electrode catalyst layer 1 and the electrolyte membrane are unified with each other excels in exfoliation ratio during the heat cycles and the cross leakage amount (gas permeability: cc/cm$^2$) and, especially it has been proven that those whose depth of the catalyst particles entering in the electrolyte membrane ranging from 5 to 20 $\mu$m is preferred. In contrast, it has also been proven that the membrane electrode assembly of Comparative Example 2 in which the electrode catalyst layer 1 and the electrolyte membrane are not unified with each other has remarkable poor exfoliation ratio.

Also, it has been understood that when the depth of the catalyst entering in the electrolyte membrane is shallow, it has a tendency that the density gradient coefficient becomes large and a tendency that the exfoliation ratio during the heat cycles becomes small. In order to make the depth of the catalyst entering in the electrolyte membrane deep, the viscosity of the slurry is proven to be small. Also, in order to make the depth of the catalyst entering in the electrolyte membrane deep, the amount of the redial solvent has been proven to be large.

Figure 10:
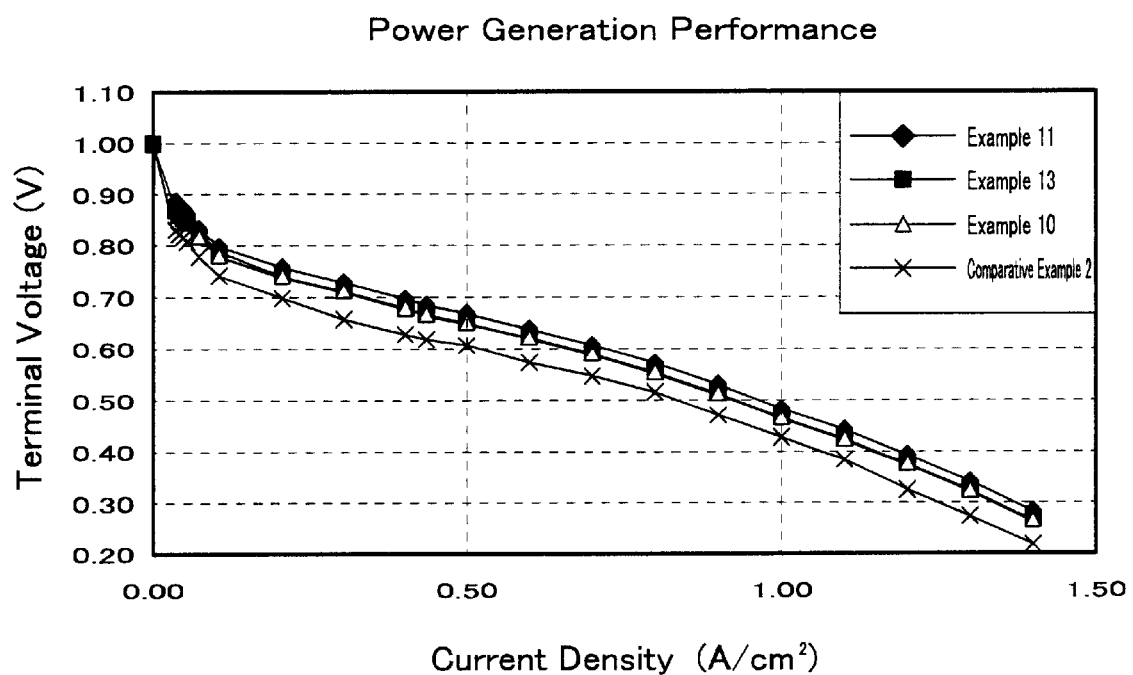
FIG. 10 is a graph showing the relation between the current density and terminal voltage according to another embodiment of the present invention and Comparative Example.

As shown in FIG. 10, over the entire region of the current density measured, the membrane electrode assembly MEA of the present invention has a terminal voltage higher than that of Comparative Example 2. Consequently, the membrane electrode assembly according to the present invention not only excels in durability but also has a capability of supplying much higher power.

the exfoliation ratio was obtained as an exfoliated area in a unit observation area. The cross leakage amount (gas permeability: cc/cm$^2$) was obtained by fitting the membrane electrode assembly to a single cell for a fuel cell, immersing the single cell in water, supplying test gas from a gas inlet, and measuring the amount of the gas exhaust from the gas outlet via the membrane material.

Examples 20 to 27 and Comparative Example 3

Figure 11:
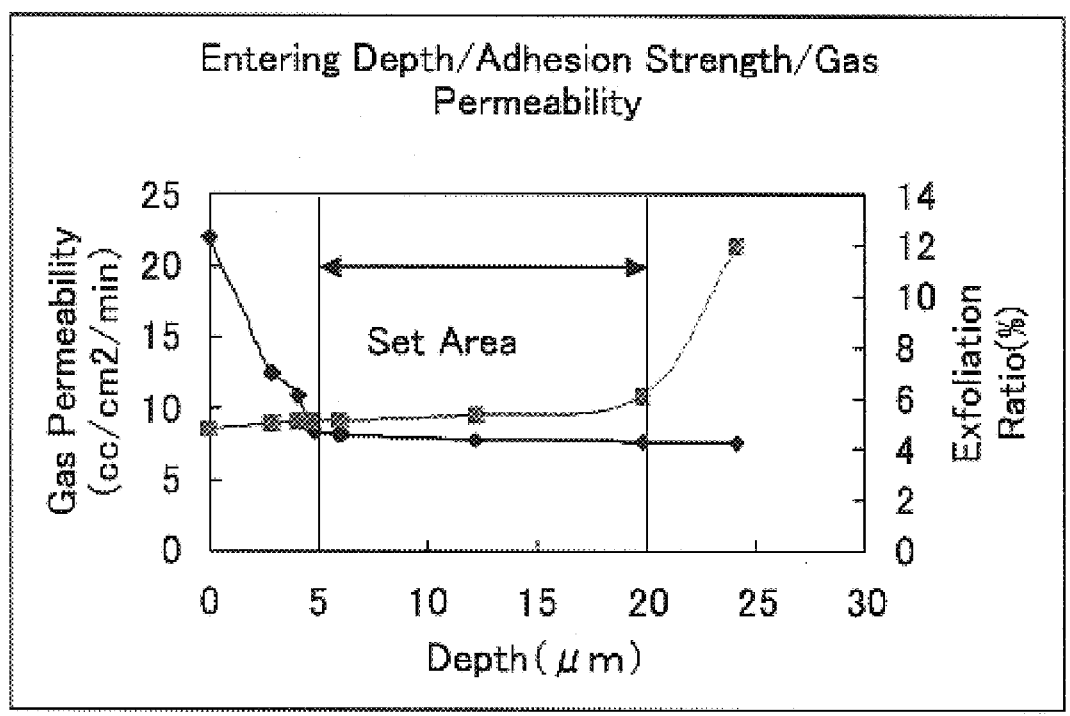
FIG. 11 is a graph showing the relation between the depth of the electrode catalyst layer entering in the electrolyte membrane and gas-permeability, and the exfoliation rate during a given heat cycle according to still another embodiment of the present invention and Comparative Example.

Example 19 was repeated, except for varying the viscosities of the slurry and the residual amounts of the solvent shown in Table 3. The results are shown in Table 1 and FIGS. 11 and 12.

TABLE 3

|  | Production Conditions | | Physical Properties of Membrane electrode assembly | | |
| --- | --- | --- | --- | --- | --- |
|  | Residual Solvent | Viscosity | Depth ($\mu$M) | Density Gradient Coefficient | Exfoliation Ratio During Heat Cycles | Cross Leakage Amount |
| Ex. 1 | 100 | 1500 | 19.8 | 867.68 | 7.7 | 6.12 |
| Ex. 2 | 50 | 1500 | 12.1 | 1419.83 | 7.8 | 5.36 |
| Ex. 3 | 20 | 1500 | 5.9 | 2911.86 | 8.2 | 5.13 |
| Ex. 4 | 20 | 5000 | 4.8 | 3579.17 | 8.5 | 5.08 |
| Ex. 5 | 20 | 25000 | 6.1 | 2816.39 | 8.2 | 5.13 |
| Ex. 6 | 20 | 3000 | 2.8 | 6135.71 | 12.5 | 5.00 |
| Ex. 7 | 20 | 35000 | 4.1 | 4190.24 | 10.9 | 5.05 |
| Ex. 8 | 10 | 15000 | 2.9 | 5924.14 | 12.5 | 5.00 |
| Ex. 9 | 150 | 15000 | 24.1 | 712.86 | 7.6 | 12.00 |
| Comp. Ex. 1 | <0.5 | 15000 | 0.0 | — | 22 | 4.80 |

Example 19

An electrolytic component (PE: ion conductive polymeric substance) soluble in a polar solvent was mixed with catalyst particles (Cat) in a proportion so as to be a PE/Cat in weight ratio equal to 0.4, and then a solvent (N-methylpyrolidone) was added thereto so as to be a viscosity of 5,000 mPa.s, to thereby prepare slurry. The resulting slurry was was applied on a diffusion layer on which a water repellant layer had been formed in advance, the applied surface of the slurry was laminated on the electrolyte membrane, and then the slurry was dried until the residual amount of the polar solvent was 100 mg/cm$^2$, and then hot-press was carried out to unify the electrode catalyst layer 1 with the electrolyte membrane M, giving an membrane electrode assembly MEA according to the present invention. The physical properties of the resulting membrane electrode assembly MEA are shown in Table 3 and FIGS. 11 and 12.

In Table 3, the depth of the catalyst entering in the electrolyte membrane ($\mu$m) was actually determined by a scanning electro microscope (SEM), the gradient density was obtained by measuring the average distance between the catalyst particles entering from both sides, and calculated from the equation (1) described above.

The exfoliation ratio during the heat cycle was obtained by repeating 100 cycles of the heat environment where the membrane electrode assembly was kept at −40° C. for 30 minutes and at 90° C. for 30 minutes, and the situation of the exfoliation at the surface was image-processed. The value of As shown in Table 3 and FIG. 11, it has proven that the membrane electrode assembly of the present invention in which the electrode catalyst layer 1 and the electrolyte membrane are unified with each other excels in exfoliation ratio during the heat cycles and the cross leakage amount (gas permeability: cc/cm$^2$) and, especially it has been proven that those whose depth of the catalyst particles entering in the electrolyte membrane ranging from 5 to 20 $\mu$m is preferred. In contrast, it has also been proven that the membrane electrode assembly of Comparative Example 3 in which the electrode catalyst layer 1 and the electrolyte membrane are not unified with each other has remarkable poor exfoliation ratio.

Also, it has been understood that when the depth of the catalyst entering in the electrolyte membrane is shallow, it has a tendency that the density gradient coefficient becomes large and a tendency that the exfoliation ratio during the heat cycles becomes small. In order to make the depth of the catalyst entering in the electrolyte membrane deep, the viscosity of the slurry is proven to be small. Also, in order to make the depth of the catalyst entering in the electrolyte membrane deep, the amount of the redial solvent has been proven to be large.

Figure 12:
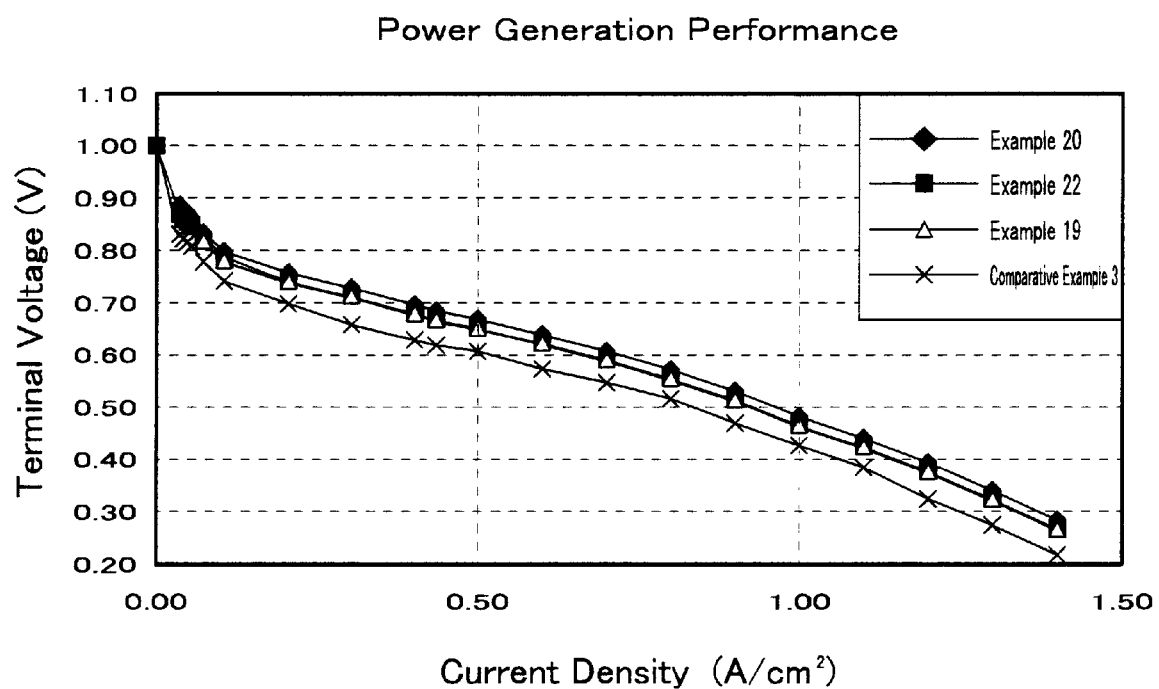
FIG. 12 is a graph showing the relation between the current density and terminal voltage according to still another embodiment of the present invention and Comparative Example.

As shown in FIG. 12, over the entire region of the current density measured, the membrane electrode assembly MEA of the present invention has a terminal voltage higher than that of Comparative Example 3. Consequently, the membrane electrode assembly according to the present invention not only excels in durability but also has a capability of supplying much higher power.

While the specific embodiment and examples of the present invention have been described above, the present invention is not thereto, it should be noted that various modifications can be made by those skilled in the art without departing from the spirits and the scope of the present invention. The present invention is only restricted to the appended claims:

What is claimed is:

1. An membrane electrode assembly for a fuel cell composed of a pair of electrode catalyst layers and an electrolyte membrane sandwiched between the electrode catalyst layers which is configured so that the catalyst of at least one surface of the electrode catalyst layers enters in the electrolyte membrane whereby the electrode catalyst layer and the electrolyte membrane are unified with each other.

2. The membrane electrode assembly for a fuel cell as claimed in claim 1, wherein an ion exchange density gradient coefficient calculated by the following equation (1):

$$\text{Coefficient}=(A-B)/(C-D) \qquad (1)$$

wherein A is an ion exchange capacity of the electrolyte membrane, B is an ion exchange capacity of the electrode catalyst layer, C is a thickness in $\mu$m of the electrolyte membrane before heating under a pressure, and D is a thickness in $\mu$m of the electrolyte membrane after heating under a pressure at a portion no catalyst enters therein, is not greater than 3.5×103 meq/g/cm.

3. The membrane electrode assembly for a fuel cell as claimed in claim 2, wherein the depth of the catalyst entering in the electrode is in the range of from 5 $\mu$m to 20 $\mu$m.

4. The membrane electrode assembly for a fuel cell as claimed in claim 3, which is produced by dissolving the catalyst in a polar solvent and then dispersing the catalyst in an ion conductive polymer solution to prepare a slurry, directly applying the slurry onto at least one surface of the electrolyte membrane, followed by heating under a pressure to form the electrode catalyst layer or layers and to allow at least parts of the catalysts for entering in said electrolyte membrane during the heating under a pressure whereby said electrode catalyst layer and said electrolyte membrane are unified with each other.

5. The membrane electrode assembly for a fuel cell as claimed in claim 3, which is produced by dispersing the catalyst in an organic solvent soluble in said electrolyte membrane to prepare a slurry of the catalyst dispersed in the organic solvent, directly applying the slurry onto at least one surface of the electrolyte membrane, followed by heating under a pressure to form the electrode catalyst layer or layers and to allow at least parts of the catalysts for entering in said electrolyte membrane during the heating under a pressure whereby said electrode catalyst layer and said electrolyte membrane are unified with each other.

6. The membrane electrode assembly for a fuel cell as claimed in claim 3, which is produced by dissolving the catalyst in a polar solvent and then dispersing the catalyst in an ion conductive polymer solution to prepare a slurry, directly applying the slurry onto at least one surface of a diffusion layers to be laminated on both sides of said membrane electrode assembly for a fuel cell, applying the applied surface of said slurry onto the surface of said electrolyte membrane, followed by heating under a pressure to form the electrode catalyst layer or layers and to allow at least parts of the catalysts for entering in said electrolyte membrane during the heating under a pressure whereby said electrode catalyst layer and said electrolyte membrane are unified with each other.

7. The membrane electrode assembly for a fuel cell as claimed in claim 2, which is produced by dissolving the catalyst in a polar solvent and then dispersing the catalyst in an ion conductive polymer solution to prepare a slurry, directly applying the slurry onto at least one surface of the electrolyte membrane, followed by heating under a pressure to form the electrode catalyst layer or layers and to allow at least parts of the catalysts for entering in said electrolyte membrane during the heating under a pressure whereby said electrode catalyst layer and said electrolyte membrane are unified with each other.

8. The membrane electrode assembly for a fuel cell as claimed in claim 2, which is produced by dispersing the catalyst in an organic solvent soluble in said electrolyte membrane to prepare a slurry of the catalyst dispersed in the organic solvent, directly applying the slurry onto at least one surface of the electrolyte membrane, followed by heating under a pressure to form the electrode catalyst layer or layers and to allow at least parts of the catalysts for entering in said electrolyte membrane during the heating under a pressure whereby said electrode catalyst layer and said electrolyte membrane are unified with each other.

9. The membrane electrode assembly for a fuel cell as claimed in claim 2, which is produced by dissolving the catalyst in a polar solvent and then dispersing the catalyst in an ion conductive polymer solution to prepare a slurry, directly applying the slurry onto at least one surface of a diffusion layers to be laminated on both sides of said membrane electrode assembly for a fuel cell, applying the applied surface of said slurry onto the surface of said electrolyte membrane, followed by heating under a pressure to form the electrode catalyst layer or layers and to allow at least parts of the catalysts for entering in said electrolyte membrane during the heating under a pressure whereby said electrode catalyst layer and said electrolyte membrane are unified with each other.

10. The membrane electrode assembly for a fuel cell as claimed in claim 1, wherein the depth of the catalyst entering in the electrode is in the range of from 5 $\mu$m to 20 $\mu$m.

11. The membrane electrode assembly for a fuel cell as claimed in claim 10, which is produced by dissolving the catalyst in a polar solvent and then dispersing the catalyst in an ion conductive polymer solution to prepare a slurry, directly applying the slurry onto at least one surface of the electrolyte membrane, followed by heating under a pressure to form the electrode catalyst layer or layers and to allow at least parts of the catalysts for entering in said electrolyte membrane during the heating under a pressure whereby said electrode catalyst layer and said electrolyte membrane are unified with each other.

12. The membrane electrode assembly for a fuel cell as claimed in claim 10, which is produced by dispersing the catalyst in an organic solvent soluble in said electrolyte membrane to prepare a slurry of the catalyst dispersed in the organic solvent, directly applying the slurry onto at least one surface of the electrolyte membrane, followed by heating under a pressure to form the electrode catalyst layer or layers and to allow at least parts of the catalysts for entering in said electrolyte membrane during the heating under a pressure whereby said electrode catalyst layer and said electrolyte membrane are unified with each other.

13. The membrane electrode assembly for a fuel cell as claimed in claim 10, which is produced by dissolving the catalyst in a polar solvent and then dispersing the catalyst in an ion conductive polymer solution to prepare a slurry, directly applying the slurry onto at least one surface of a diffusion layers to be laminated on both sides of said membrane electrode assembly for a fuel cell, applying the applied surface of said slurry onto the surface of said electrolyte membrane, followed by heating under a pressure to form the electrode catalyst layer or layers and to allow at least parts of the catalysts for entering in said electrolyte membrane during the heating under a pressure whereby said electrode catalyst layer and said electrolyte membrane are unified with each other.

14. The membrane electrode assembly for a fuel cell as claimed in claim 1, which is produced by dissolving the catalyst in a polar solvent and then dispersing the catalyst in an ion conductive polymer solution to prepare a slurry, directly applying the slurry onto at least one surface of the electrolyte membrane, followed by heating under a pressure to form the electrode catalyst layer or layers and to allow at least parts of the catalysts for entering in said electrolyte membrane during the heating under a pressure whereby said electrode catalyst layer and said electrolyte membrane are unified with each other.

15. The membrane electrode assembly for a fuel cell as claimed in claim 1, which is produced by dispersing the catalyst in an organic solvent soluble in said electrolyte membrane to prepare a slurry of the catalyst dispersed in the organic solvent, directly applying the slurry onto at least one surface of the electrolyte membrane, followed by heating under a pressure to form the electrode catalyst layer or layers and to allow at least parts of the catalysts for entering in said electrolyte membrane during the heating under a pressure whereby said electrode catalyst layer and said electrolyte membrane are unified with each other.

16. The membrane electrode assembly for a fuel cell as claimed in claim 1, which is produced by dissolving the catalyst in a polar solvent and then dispersing the catalyst in an ion conductive polymer solution to prepare a slurry, directly applying the slurry onto at least one surface of a diffusion layers to be laminated on both sides of said membrane electrode assembly for a fuel cell, applying the applied surface of said slurry onto the surface of said electrolyte membrane, followed by heating under a pressure to form the electrode catalyst layer or layers and to allow at least parts of the catalysts for entering in said electrolyte membrane during the heating under a pressure whereby said electrode catalyst layer and said electrolyte membrane are unified with each other.

17. A process for an membrane electrode assembly for a fuel cell composed of a pair of electrode catalyst layers and an electrolyte membrane sandwiched between the electrode catalyst layers configured so that the catalyst of at least one surface of the electrode catalyst layers enters in the electrolyte membrane whereby the electrode catalyst layer and the electrolyte membrane are unified with each other, which comprises:

dissolving the catalyst making up the electrode catalyst layer in a polar solvent and then dispersing the catalyst in an ion conductive polymer solution to prepare a slurry having a viscosity of from 5,000 to 25,000 mPa.s, directly applying the resulting slurry onto at least one surface of the electrolyte membrane, followed by heating under a pressure to form the electrode catalyst layer or layers, and heating the slurry under a pressure to allow at least parts of the catalysts for entering in said electrolyte membrane during the heating under a pressure whereby said electrode catalyst layer and said electrolyte membrane are unified with each other.

18. The process for an membrane electrode assembly for a fuel cell as claimed in claim 17, wherein the heating under a pressure is carried out in a state where the polar solvent remaining in the slurry directly applied onto the electrolyte membrane is in amount of from 20 mg/cm$^2$ to 100 mg/cm$^2$ to allow the catalysts for entering in said electrolyte membrane.

19. A process for an membrane electrode assembly for a fuel cell composed of a pair of electrode catalyst layers and an electrolyte membrane sandwiched between the electrode catalyst layers configured so that the catalyst of at least one surface of the electrode catalyst layers enters in the electrolyte membrane whereby the electrode catalyst layer and the electrolyte membrane are unified with each other, which comprises:

dispersing the catalyst making up the electrode catalyst layer in an organic solvent soluble in the electrolyte membrane to prepare a slurry of the catalyst dispersed in the organic solvent having a viscosity of from 5,000 to 25,000 mPa.s, directly applying the resulting slurry onto at least one surface of the electrolyte membrane, followed by heating under a pressure to form the electrode catalyst layer or layers, and heating the slurry under a pressure to allow at least parts of the catalysts for entering in said electrolyte membrane during the heating under a pressure whereby said electrode catalyst layer and said electrolyte membrane are unified with each other.

20. The process for an membrane electrode assembly for a fuel cell as claimed in claim 19, wherein the heating under a pressure is carried out in a state where the polar solvent remaining in the slurry directly applied onto the electrolyte membrane is in amount of from 20 mg/cm$^2$ to 100 mg/cm$^2$ to allow the catalysts for entering in said electrolyte membrane.

21. A process for an membrane electrode assembly for a fuel cell composed of a pair of electrode catalyst layers and an electrolyte membrane sandwiched between the electrode catalyst layers is configured so that the catalyst of at least one surface of the electrode catalyst layers enters in the electrolyte membrane whereby the electrode catalyst layer and the electrolyte membrane are unified with each other, which comprises:

dissolving the catalyst making up the electrode catalyst layer in a polar solvent and then dispersing the catalyst in an ion conductive polymer solution to prepare a slurry having a viscosity of from 5,000 to 25,000 mPa.s, directly applying the resulting slurry onto at least one surface the diffusion layer laminated on both sides of the membrane electrode assembly, applying the electrolyte membrane onto the applied surface of the slurry, followed by heating under a pressure to form the electrode catalyst layer or layers, and heating the slurry under a pressure to allow at least parts of the catalysts for entering in said electrolyte membrane during the heating under a pressure whereby said electrode catalyst layer and said electrolyte membrane are unified with each other.

22. The process for an membrane electrode assembly for a fuel cell as claimed in claim 21, wherein the heating under a pressure is carried out in a state where the polar solvent remaining in the slurry directly applied onto the electrolyte membrane is in amount of from 20 mg/cm$^2$ to 100 mg/cm$^2$ to allow the catalysts for entering in said electrolyte membrane.

* * * * *